United States Patent [19]

Cavil et al.

[11] 4,275,322
[45] Jun. 23, 1981

[54] ROTARY PULSE GENERATOR

[75] Inventors: David T. Cavil, Menomonee Falls; William R. Krueger, Hartford, both of Wis.

[73] Assignee: Outboard Marine Corporation, Waukegan, Ill.

[21] Appl. No.: 26,296

[22] Filed: Apr. 2, 1979

Related U.S. Application Data

[62] Division of Ser. No. 883,914, Mar. 6, 1978.

[51] Int. Cl.³ ............................................ H02K 39/00
[52] U.S. Cl. ................................. 310/111; 310/70 R; 310/74; 310/153; 123/601; 322/89
[58] Field of Search ............... 310/68 R, 70 R, 70 A, 310/156, 115, 75 R, 168, 74, 153, 169, 170, 111; 322/89, 91; 123/148 CC, 149 D

[56] References Cited

U.S. PATENT DOCUMENTS

| | | | |
|---|---|---|---|
| 2,856,550 | 10/1958 | Phelon | 310/153 |
| 3,398,353 | 8/1968 | Noddin | 123/148 CC |
| 3,576,183 | 4/1971 | Miyamoto | 123/148 CC |
| 3,732,483 | 5/1973 | Katsumata | 322/91 |
| 3,893,439 | 7/1975 | Chudoba | 123/148 CC |
| 3,974,817 | 8/1976 | Henderson | 123/149 D |
| 4,014,309 | 3/1977 | Nagasawa | 123/148 CC |
| 4,019,485 | 4/1977 | Carlsson | 123/148 CC |
| 4,116,188 | 9/1978 | Nagasawa | 123/148 CC |
| 4,160,435 | 7/1979 | Slender | 123/148 CC |

Primary Examiner—R. Skudy

[57] ABSTRACT

Disclosed herein is a rotary pulse generator including an armature having a two-magnet assembly including spaced pole pieces defining a pair of spaced gaps, an armature plate including a charge core and charge coil mounted thereon, and a trigger core and trigger coil mounted thereon, said trigger core being separate from said charge core but located in proximity to said charge core so that, at a given armature speed, said trigger coil produces a repeating series of trigger pulses including a first major voltage pulse of one polarity and of a major magnitude closely followed by a second minor voltage pulse of opposite polarity and of a minor magnitude substantially less than the major magnitude, the repeating series of trigger pulses being produced in response to the two-magnet assembly sequentially rotating past the trigger core and the charge core. In a preferred embodiment, the rotary pulse generator includes a second two-magnet assembly, and the trigger core includes a thin edge extending radially outwardly so that a relatively sharp pulse is produced by the trigger coil each time one of the spaced gaps passes thereby.

3 Claims, 8 Drawing Figures

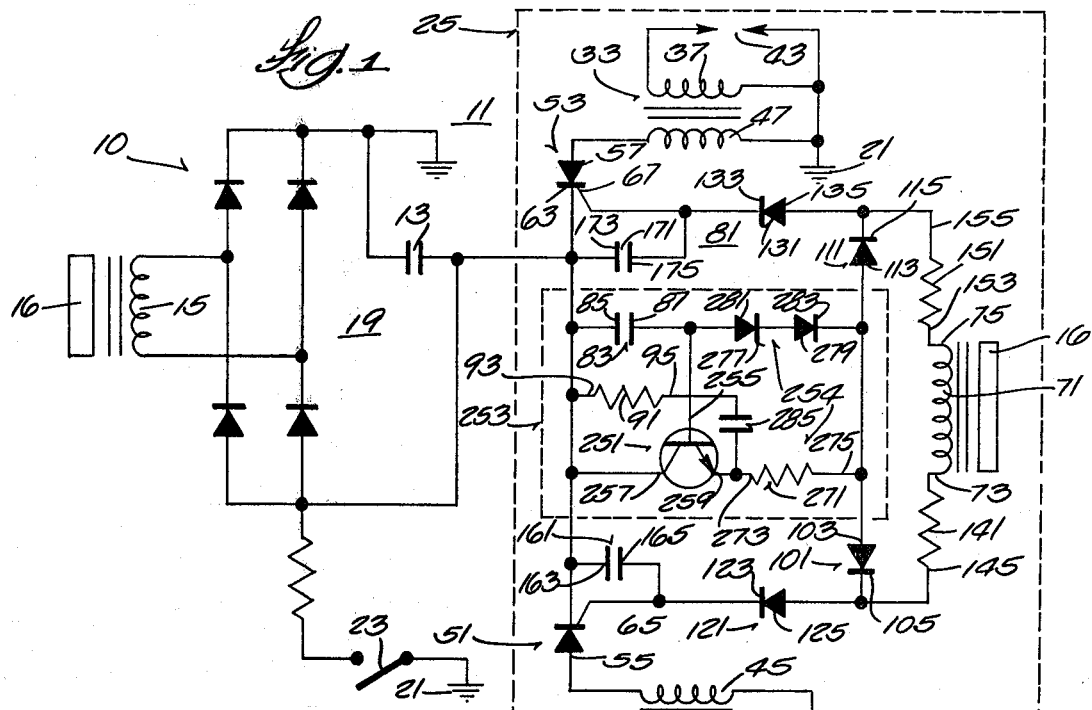
Fig. 1
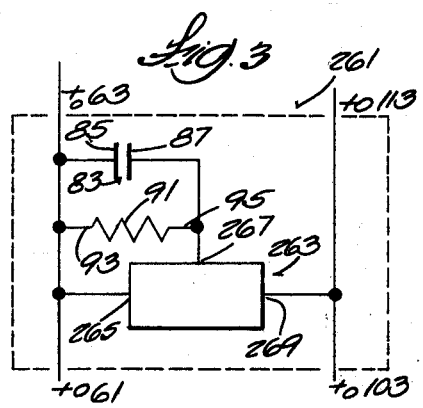
Fig. 3
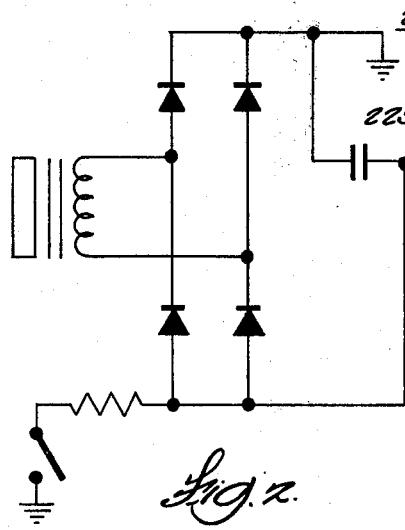
Fig. 2
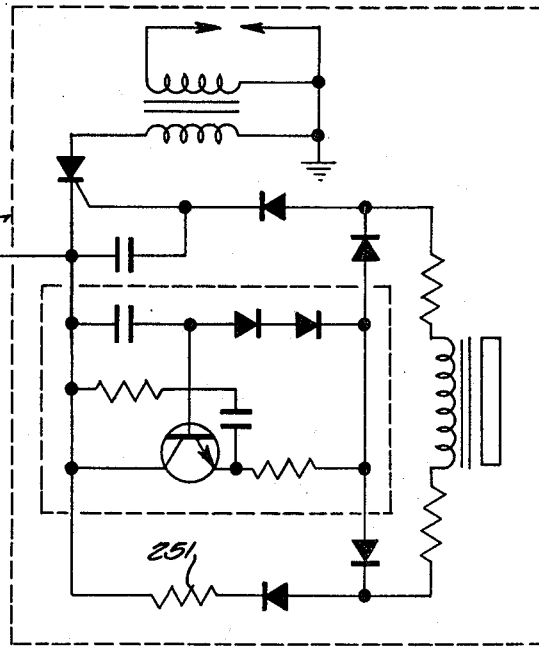

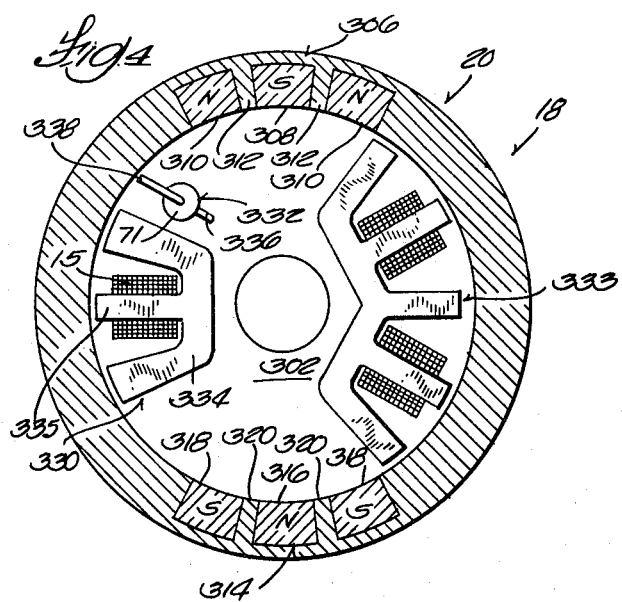
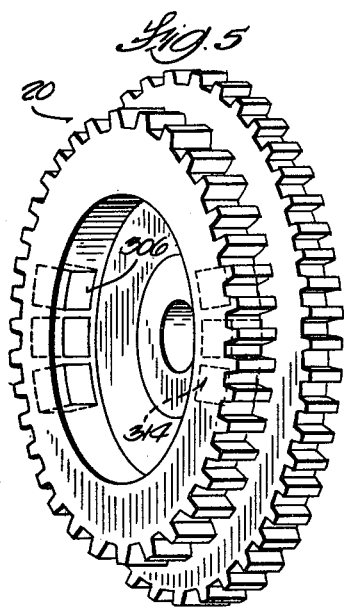
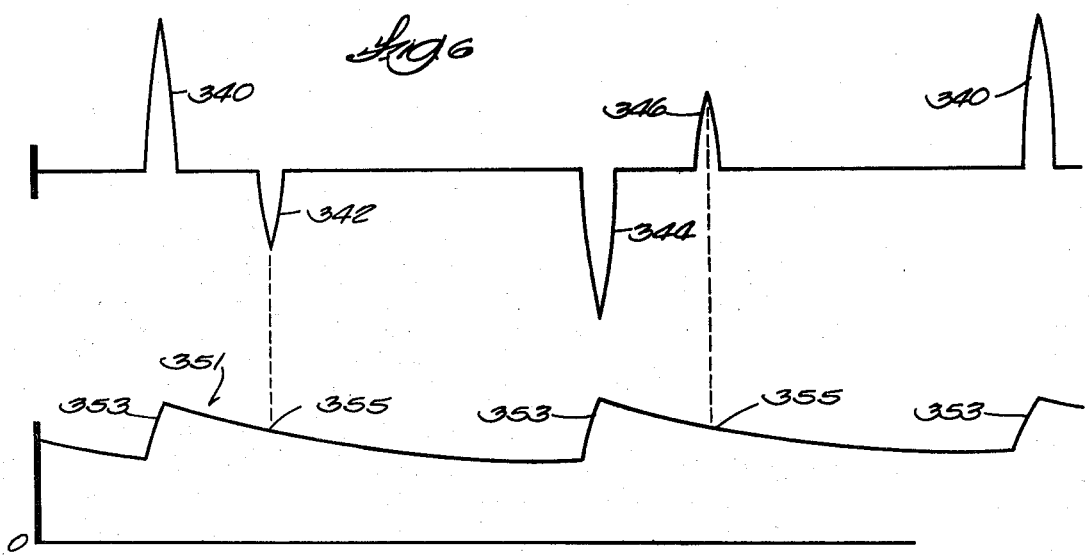
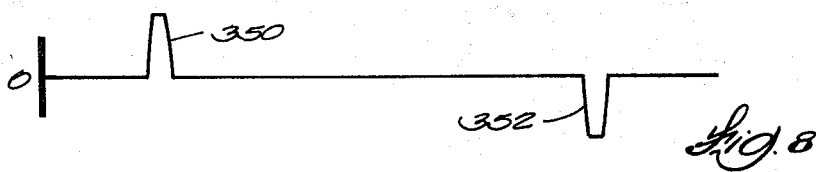

ROTARY PULSE GENERATOR

This is a division of application Ser. No. 883,914, filed Mar. 6, 1978.

BACKGROUND OF THE INVENTION

The invention relates generally to capacitor discharge ignition systems and, more particularly, to such systems including a rotary pulse generator for providing trigger pulses and an ignition circuit which detects the trigger pulses to control conduction of semi-conductor switches which, in turn, discharge a storage capacitor to control the production of ignition voltages for firing spark plugs.

Still more particularly, the invention relates to a capacitor discharge ignition system which includes a rotary pulse generator which provides major and minor trigger pulses, and an ignition circuit which is an improvement over the ignition circuit disclosed in U.S. Mura Pat. No. 4,007,724, and which discriminates between the major and minor pulses so that the major pulses control conduction of the semi-conductor switches.

Attention is directed to the following U.S. Pat. Nos. which disclose capacitor discharge ignition systems: Mura 4,007,724 issued Feb. 15, 1977; Anderson 3,975,915 issued Apr. 8, 1975; Jereb 3,809,044 issued May 7, 1974; Cavil 3,577,971 issued May 11, 1971.

SUMMARY OF THE INVENTION

The invention provides an engine ignition system comprising a charge capacitor, means for periodically charging the capacitor, first and second ignition coils respectively including first and second primary windings and first and second secondary windings connected respectively to first and second spark plugs, first and second electronic switches respectively including first and second anodes connected respectively to first and second primary windings, first and second cathodes connected to the charge capacitor, and first and second control elements operable, upon application thereto of a trigger current pulse, to cause the first and second switches to be conductive. The system also includes rotary pulse generator means including a relatively rotatable magnet and trigger coil for generating trigger voltage pulses in response to engine rotation, the trigger coil having first and second ends respectively connected to the first and second control elements, a first diode having a cathode connected to and between the first end of the trigger coil and the first control element and having an anode, and a second diode having a cathode connected to and between the second end of the trigger coil and the control element, and having an anode. Active pulse discriminating means are included for preventing false triggering of the switches, the discriminating means comprising an active filter circuit including a blocking capacitor having a first plate connected to the first and second cathodes and having a second plate, a resistor having a first end connected to the first and second cathodes and having a second end, the blocking capacitor developing a blocking voltage when a trigger voltage pulse is applied to the first plate, the filter circuit also including current control means having a first terminal connected to the first and second cathodes and the first plate of the capacitor and to the first end of the resistor, a second terminal connected to the second plate of the capacitor and to the second end of the resistor, and a third terminal connected to and between the anodes of the first and second diodes, the current control means being rendered conductive so that a trigger current pulse sufficient to render one of the switches conductive flows between the first and third terminals and through the trigger coil when a trigger voltage pulse exceeds the blocking voltage and a control current is applied to the second terminal.

In accordance with a preferred embodiment of the invention, there is provided an engine ignition system wherein the active filter circuit further comprises current limiting means for limiting the trigger current pulse flowing between the first and third terminals of the current control means to a magnitude sufficient to render one of the first and second switches conductive.

Also in accordance with a preferred embodiment of the invention, there is provided an engine ignition system wherein the current control means comprises a transistor having a collector, a base, and an emitter, wherein the first terminal comprises the transistor collector, the second terminal comprises the transistor base, and the third terminal comprises the transistor emitter, and wherein the current limiting means comprises the transistor emitter, and wherein the current limiting means comprises a resistor having one end connected to the emitter and an opposite end connected to and between the anodes of the first and second diodes, and further comprises voltage threshold means connected to and between the base and the opposite end of the resistor.

Also in accordance with a preferred embodiment of the invention, there is provided an engine ignition system wherein the trigger coil of the rotary pulse generator means produces, at a given engine speed, a repeating series of pulses comprising a first major positive voltage pulse closely followed by a second minor negative voltage pulse, and a third major negative voltage pulse closely followed by a fourth minor positive voltage pulse, the minor pulses having generally equal magnitudes substantially less than the magnitudes of the major pulses, the major pulses having substantially the same magnitudes and being spaced substantially 180 degrees apart with respect to engine rotation, and wherein the active pulse discriminating means prevents false triggering of the switches in response to the minor pulses, the switches being alternatively rendered conductive in response to the major pulses substantially every 180 degrees of engine rotation.

The invention also provides an engine ignition system comprising a thyristor including an anode, a cathode, and a gate, the thyristor being rendered conductive through the anode-cathode path in response to current flow through the gate-cathode path, an ignition coil including a primary winding connected in series with the anode, means for supplying current flow through the primary winding subject to conduction of the thyristor, and rotary pulse generator means including a trigger coil connected to the gate and adapted to generate trigger voltage pulses and to provide trigger current pulses to the thyristor gate to render the thyristor conductive. The system also includes active pulse discriminating means for preventing conduction of the thyristor in response to application to the gate-cathode path of a voltage pulse below a blocking voltage, the discriminating means comprising an active filter circuit including a capacitor/resistor network comprising a blocking capacitor and resistor connected in parallel, the network having one end connected to the thyristor cathode and having an opposite end, the capacitor developing the blocking voltage when a trigger voltage pulse is applied to the network, the active filter circuit also including current control means having a first terminal connected to the one end of the network, a second terminal connected to the opposite end of the network, and a third terminal connected to the trigger coil, the current control means being rendered conductive so that a trigger current pulse sufficient to render the thyristor conductive flows between the first and third terminals and to the trigger coil and through the gate-cathode path when a trigger voltage pulse exceeds the blocking voltage and a control current is applied to the second terminal.

The invention also provides a rotary pulse generator including an armature having a two-magnet assembly including spaced pole pieces defining a pair of spaced gaps, an armature plate including a charge core and a charge coil mounted thereon, and a trigger core and a trigger coil mounted thereon, said trigger core being located in close proximity to the charge core so that the trigger coil produces a first major voltage pulse closely followed by a second minor voltage pulse of opposite polarity in response to the two-magnet assembly sequentially rotating past the trigger core and the charge core, the minor pulse having a magnitude substantially less than the magnitude of the major pulse.

Also in accordance with a preferred embodiment of the invention, there is provided a rotary pulse generator wherein the charge core is generally E-shaped and includes a pair of end legs and a central leg spaced between the end legs, wherein the charge coil is mounted on the central leg, and wherein the trigger coil is located adjacent one of the end legs and includes a thin edge extending radially outwardly so that a relatively sharp pulse is produced by the trigger coil each time one of the spaced gaps passes thereby.

One of the principal features of the invention is the provision of capacitor discharge ignition system with active pulse discriminating means which is operable to discriminate between major and minor or noise pulses so as to prevent false triggering when the minor or noise pulses occur.

Another of the principal features of the invention is the provision of such an ignition system wherein the active pulse discriminating means includes current limiting means which prevents loading down of the trigger coil, but which insures sufficient trigger coil current to effect the firing of a thyristor and a spark plug.

Another of the principal features of the invention is the provision of a capacitive discharge ignition system having a rotary pulse generator which includes a standard four magnet flywheel and which includes an armature plate having a charge coil core assembly and a trigger coil core assembly located in close proximity so that the trigger coil provides closely spaced major and minor trigger pulses of opposite polarity in response to rotation of the flywheel.

Another of the principal features of the invention is the provision of such an ignition system with active pulse discriminating means which can be utilized with the above described rotary pulse generator to discriminate between the major and minor pulses so that the major pulses control the firing of the spark plugs of a two-cylinder engine.

Other features and advantages of the embodiments of the invention will become known by reference to the following drawings, general description and appended claims.

THE DRAWINGS

FIG. 1 is a schematic diagram of a capacitor discharge ignition system including an active filter circuit and which embodies various of the features of the invention.

FIG. 2 is a schematic diagram of another capacitor discharge ignition system which embodies various of the features of the invention.

FIG. 3 is a schematic diagram of an alternative active filter circuit which could be substituted for the active filter circuit utilized in the ignition systems of FIGS. 1 and 2.

FIG. 4 is a more detailed diagrammatic view of the rotary pulse generator included in the ignition system of FIG. 1.

FIG. 5 is a more detailed diagrammatic view of the four magnet flywheel included in the rotary pulse generator shown in FIG. 4.

FIG. 6 illustrates the voltage wave form produced by the trigger coil included in the ignition system shown in FIG. 1.

FIG. 7 illustrates the blocking voltage wave form impressed on the capacitor included in the filter circuit included in the ignition system shown in FIG. 1.

FIG. 8 illustrates the current wave form produced by the trigger coil included in the ignition system shown in FIG. 1.

Before explaining the embodiments of the invention in detail, it is to be understood that the invention is not limited in its application to the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

The capacitor discharge ignition system 10 shown in FIG. 1 includes an ignition circuit 11 which is particularly adapted for operating a two cylinder internal combustion engine (not shown) and includes a charge capacitor 13, together with means for periodically charging the capacitor. Any suitable means can be employed for charging the capacitor. In the illustrated construction, such charging means preferably comprises a rotary pulse generator 18 (see FIGS. 4 and 5) including an armature plate having a charge coil 15 and including a four magnet flywheel 20 having magnets 16 which are rotated by the engine past the charge coil 15. The coil 15 is connected to a suitable rectifying bridge 19 which, in turn, is connected, as shown in FIG. 1, to the plates of the capacitor 13. The bridge 19 is also connected, as shown in FIG. 1, to ground 21 and to a shorting or "kill" switch 23 connected to ground 21. The rotary pulse generator 18 shown in FIG. 4 will be described in more detail below.

The ignition circuit 11 further includes a trigger sub-circuit 25 comprising first and second ignition coils 31 and 33 respectively including first and second secondary windings 35 and 37 respectively connected, at one end, to first and second spark plugs 41 and 43 and respectively connected, at the other end, to ground 21 and to one end of respective first and second primary windings 45 and 47. The other ends of the first and secondary primary windings 45 and 47 are respectively connected to first and second electronic switches 51 and 53 which, in turn, are connected to the charge capacitor 13.

Preferably, the first and second electronic switches 51 and 53 comprise first and second SCRs respectively having first and second anodes 55 and 57 respectively connected to the first and second primary windings 45 and 47, first and second cathodes 61 and 63 connected to the charge capacitor 13, and first and second gates or control elements 65 and 67 operable, upon application of a trigger pulse, to respectively cause the first and second SCRs 51 and 53 to be conductive.

Means are provided for triggering the switches 51 and 53 to cause spark generation at the spark plugs 41 and 43. Various arrangements are possible. In the illustrated construction, such means comprises the rotary pulse generator 18 which includes a sensor or trigger coil 71 mounted on the armature plate and having first and second ends 73 and 75 respectively connected to the first and second control elements or gates 65 and 67. Magnets 16 are rotatable by the engine relative to the trigger coil 71 to provide successive trigger pulses of opposite polarity. As will be described in more detail below, the pulse generating magnets 16 and trigger coil and core are constructed to provide sharp major and minor pulses which are produced at substantially constant positions of the pistons in the cylinders regardless of the rate of engine rotation.

In order to avoid false triggering of the SCRs 51 and 53 in response to the minor pulses, or in response to stray pulses which can sometimes occur, particularly with increasing engine speed, the sub-circuit 25 also includes a network 81 comprising a second or blocking capacitor 83 having a first plate 85 connected to the first and second cathodes 61 and 63 of the SCRs 51 and 53 and to the charge capacitor 13. In addition, the blocking capacitor 83 includes a second plate 87.

The capacitor 83 serves, in cooperation with the other components of the network 81, to establish an increased operating voltage or blocking voltage below which stray pulses will be ineffective to cause conduction of the SCRs. In operation, the capacitor 83 is variably charged in response to current flow in the gate and cathode path of the SCRs 51 and 53. Thus the operating or blocking voltage level rises and falls with increasing and decreasing engine speed.

The network 81 also includes a resistor 91 having one end 93 connected to the first and second cathodes 61 and 63 of the SCRs 51 and 53 and to the charge capacitor 13 in parallel with the connection thereto of the first plate 85 of the blocking capacitor 83. In addition, the resistor 91 includes a second end 95.

The resistor 91 provides a discharge path for the blocking capacitor 83 such that the level of blocking voltage on the control elements or gates floats up with increasing speed and down with decreasing speed, thus masking out minor and unwanted noise pulses which also tend to increase and decrease with speed.

The network 81 further includes a first diode 101 having an anode 103 and a cathode 105 electrically connected to and between the first end 73 of the trigger coil 71 and the gate 65 of the first SCR 51. The network 81 also includes a second diode 111 having an anode 113 and having a cathode 115 electrically connected to and between the second end 75 of the trigger coil 71 and the gate 67 of the second SCR 53.

Preferably, the circuit 11 further includes a third diode 121 connected between the gate 65 of the first SCR 51 and the first diode 101 and the first end 73 of the trigger coil 71. More particularly, the third diode 121 includes a cathode 123 connected to the gate 65 of the first SCR 51 and an anode 125 connected to the cathode 105 of the first diode 101 and to the first end 73 of the trigger coil 71.

In addition, the circuit 11 further includes a fourth diode 131 connected between the gate 67 of the second SCR 53 and the second diode 111 and the second end 75 of the trigger coil 71. More particularly, the fourth diode 131 includes a cathode 133 connected to the gate 67 of the second 53 and an anode 135 connected to the cathode 115 of the second diode 111 and to the second end 75 of the trigger coil 71.

Preferably, the circuit 11 further includes a second resistor 141 having one end 143 connected to the first end 73 of the trigger coil 71 and having a second end 145 connected to the cathode 105 of the first diode 101 and to the anode 125 of the third diode 121. In addition, the circuit preferably includes a third resistor 151 having a first end 153 connected to the second end 75 of the trigger coil 71 and a second end 155 connected to the cathode 115 of the second diode 111 and to the anode 135 of the fourth diode 131.

The circuit preferably also includes a third capacitor 161 having one plate 163 connected to the cathode 61 of the first SCR 51 and having a second plate 165 connected to the gate 65 of the first SCR 51. In addition, the circuit 11 preferably includes a fourth capacitor 171 having one plate 173 connected to the cathode 63 of the second SCR 53 and a second plate 175 connected to the gate 67 of the second SCR 53. The capacitors 161 and 171 provide low impedance paths for masking noise pulses and thus assist in preventing unwanted conduction by the SCRs.

The construction of the trigger sub-circuit as described so far is generally disclosed in U.S. Mura Pat. No. 4,007,724 issued Feb. 15, 1977.

The trigger subcircuit 25 disclosed in this application differs from the previous subcircuit disclosed in the above reference Mura Patent by the virtue of the addition of "active" pulse discriminating means. While various arrangements are possible, such means preferably comprises an active filter circuit 253 including current control means or a current amplifier, such as transistor 251, and preferably including current limiting means 254 (discussed below).

More particularly, the filter circuit 253 is part of network 81 and, in addition to including the current control means and the current limiting means, includes the previously mentioned blocking capacitor 83 and resistor 91. The inclusion of active pulse discriminating means, or the active filter circuit 253, in the network 81 results in providing the trigger sub-circuit 25 with a relatively increased capacity to discriminate between major and minor voltage pulses and to avoid false triggering.

The transistor 251 includes a first terminal or collector 257, a second terminal or base 255, and a third terminal or emitter 259. Instead of connecting the capacitor second plate 87 and resistor second end 95 to and between the anodes 103 and 113 of diodes 101 and 111 respectively, as is disclosed in the above reference Mura Patent, the second plate 87 and second end 95 are connected to the base 255 of the transistor 251. The transistor collector 257 is connected to the first and second cathodes 61 and 63 of the SCRs 51 and 53, and the emitter 259 is connected to and between the anodes 103 and 113 of diodes 101 and 111.

In operation, as engine speed increases, the potential of the trigger voltage pulse generated by the trigger coil 71 increases and consequently, a charge builds up on the first plate 85 of the blocking capacitor 83, resulting in a "blocking voltage" being impressed across the plates of the capacitor. This blocking voltage on the capacitor 83 has the effect of requiring a trigger voltage pulse having a magnitude greater than the blocking voltage to effect conduction by the switches or SCRs 51 and 53.

More particularly, after the trigger voltage pulse applied to the capacitor 83 and resistor 91 exceeds the blocking voltage of capacitor 83, a trigger current pulse flows through resistor 91 and the trigger coil to gate or effect conduction of one of the SCRs. The trigger current pulse must be of sufficient magnitude to reliably fire the SCR.

In order to explain how the active filter circuit 253, including the current amplifier or transistor 251, results in providing the trigger sub-circuit 25 with a greater capacity to avoid false triggering, reference will be made to an active filter circuit 261 shown in FIG. 3. The filter circuit 261 could be substituted in the ignition circuit 11 for the filter circuit 253, and includes current control means or a current amplifier 263 which operates in essentially the same manner as the current amplifier or transistor 251 of the filter circuit 253. The filter circuit 261 does not include the current limiting means 254 of the filter circuit 253, which current limiting means will be described below.

The current amplifier 263 included in filter circuit 261 is shown schematically as a box, and can be of any suitable type. The amplifier 263 includes a first terminal 265 connected to the SCR cathodes 61 and 63, a second terminal 267 connected to the second plate 97 of the capacitor 83 and to the second end 95 of the resistor 91, and a third terminal 269 connected to and between anodes 103 and 113 of diodes 101 and 111.

Although the construction described includes the third terminal of the current amplifier or current control means connected to the trigger coil through diodes 101 and 111, it is to be understood that variations in the circuit arrangement and in the connection of the current control means to the trigger coil could be made. For example, diodes 101 and 111 and their leads could be eliminated and the third terminal of the current control means could be connected directly to the trigger coil by means of a center tap. Such a center tap connection could be utilized to provide substantially the same trigger voltage pulses by doubling the number of turns of wire in the trigger coil.

Continuing with the description of the filter circuit 261, the current amplifier 263 is rendered conductive between the first and third terminals in response to a control current which is applied to the second terminal 267. The control current flows through resistor 91 when the trigger pulse voltage exceeds the capacitor blocking voltage. The control current required to render the current amplifier 263 conductive has a magnitude substantially less than the magnitude of a trigger current pulse required to reliably gate or fire an SCR.

Once the current amplifier 263 is rendered conductive as described, a trigger current pulse having a magnitude sufficient to trigger the SCR bypasses the capacitor 83 and resistor 91 and flows through the current amplifier 263 and the trigger coil 71 to turn on, or gate, one of the SCRs. Since a relatively small control current flowing through the resistor 91 results in a trigger current pulse flowing through the current amplifier which is sufficient to reliably gate the SCR, the impedance of the resistor and the blocking capacitor combination can be relatively large.

More particularly, the use of the current amplifier 263 allows for the use in the filter circuit 261 (or the filter circuit 253) of a relatively small blocking capacitor 83 having a relatively small capacitance, and of a relatively large resistor 91 having a relatively large resistance. Since the blocking capacitor 83 is relatively small, it charges relatively quickly. Thus, a relatively high blocking voltage can be impressed across the capacitor so that the active filter circuit has an increased capacity to prevent noise and minor voltage pulses from falsely triggering the SCRs.

In contrast, it should be noted that in the above referenced Mura patent, the blocking capacitor 83 and the resistor 91 were directly connected to the trigger coil 71 through diodes 101 and 103. Thus, in order to insure that the trigger current pulse flowing through the trigger coil was large enough to reliably fire an SCR, it was necessary that the capacitor 83 and resistor 91 combine to have a relatively low impedance, i.e. it was necessary that the Mura circuit utilize a relatively large blocking capacitor and a relatively small resistor.

The requirements that the Mura circuit utilize a relatively large blocking capacitor resulted in a slower buildup of charge on the blocking capacitor and, hence, resulted in a relatively lower blocking being impressed across the blocking capacitor. Accordingly, the ability of the Mura ignition circuit to exclude false triggering is less than the present ignition circuit which includes an active filter circuit having a current amplifier and a relatively small blocking capacitor. More particularly, the present blocking capacitor 83 used in the active filter circuit 261 (or in the active filter circuit 253) can be on the order of ten times smaller than a suitable blocking capacitor utilized in the Mura ignition circuit.

The filter circuit 253 shown in FIG. 1 includes a current amplifier or transistor 251 which operates in substantially the same manner as the current amplifier 263 previously described in connection with the operation of the filter circuit 261. The filter circuit 253 differs from the filter circuit 261 in that it also includes current limiting means 254 for limiting the trigger current pulse which flows through the emitter-collector path of the transistor. More particularly, the trigger current pulse is limited to a magnitude sufficient to reliably fire an SCR. The current limiting means minimizes the loading on the trigger coil with the result that the magnitude of the trigger voltage pulse induced in the trigger coil 71 is maximized. The maximum trigger voltage pulse, in turn, charges the relatively small blocking capacitor 83 to a relatively higher blocking voltage. Thus, use of the current limiting means 254 in the active filter circuit 253 results in providing the sub-circuit 25 with a further increased capacity to prevent noise and minor voltage pulses from falsely triggering the SCRs.

Various current limiting means arrangements could be utilized. As shown in FIG. 1, such means, generally designated 254, preferably comprises a resistor 271, having one end 273 connected to the emitter 259 and opposite end 275 connected to and between anodes 103 and 113 of diodes 101 and 111, respectively. The current limiting means 254 also include voltage threshold means, preferably comprising a pair of series connected diodes 277 and 279. The anode 281 of diode 277 is connected to the base 255 of transistor 251 and the cathode 283 of diode 279 is connected to the second end 275 of the resistor 271. As is well known to those skilled in the art, diodes 277 and 279 are rendered conductive by a predetermined positive voltage which forward biases the diodes. Other voltage threshold means such as a single diode or a suitably connected zener diode could also be utilized.

The voltage threshold means and the resistor 271 are selected so that when the trigger current pulse flowing through the collector emitter path and resistor 271 has reached a magnitude sufficient to reliably fire an SCR 51 or 53, the sum of the voltage across resistor 271 and the base emitter junction is sufficient to forward bias the voltage threshold means or diodes 277 and 279. Thus, some of the control current applied to the base 255 is shunted through diodes 277 and 279 to the trigger coil 271. This shunting of the control current causes the transistor 251 to turn on or conduct only to the extent where the trigger current pulse flowing through the collector emitter path is sufficient to reliably fire an SCR. Thus, the trigger current pulse is cut off or limited in magnitude (see FIG. 8) to minimize the loading on the trigger coil. A capacitor 285 is preferably connected between the base 255 and the emitter 259 of the transistor 251 to prevent oscillation of the transistor.

Before explaining the operation of the active filter circuit 253 in further detail, a description of the rotary pulse generator 18 shown in FIGS. 4 and 5 will be given. While it is to be understood that the ignition circuit 11 can be used with other types of rotary pulse generators to prevent false triggering, the ignition circuit 11 is particularly adapted to discriminate between the major and minor trigger voltage pulses of the rotary pulse generator 18 so that the ignition system 10 is particularly adapted for operating a two cylinder internal combustion engine.

As shown in the illustrated construction in FIG. 4, the rotary pulse generator 18 includes an armature plate 302 and an armature or fly wheel 20. The fly wheel can be rotated relative to the armature plate by any suitable means such as by a two cylinder engine (not shown). As illustrated, the fly wheel 20 is preferably a standard four-magnet fly wheel including a pair of opposed two-magnet assemblies 306 and 314 respectively having common central pole faces of opposite polarity.

More particularly, as shown in FIG. 4, the fly wheel 20 includes a first two-magnet assembly 306 including a common south pole face 308 located between a pair of north pole faces 310, which pole faces 308 and 310 define a pair of spaced gaps 312. A second two-magnet assembly 314 is located on the opposite side of the fly wheel 20 and includes a common north pole face 316 located between a pair of south pole faces 318, which pole faces define a pair of spaced gaps 320.

The armature plate 302 includes a charge coil and core assembly 330 and a trigger coil and core assembly 332 suitably secured to one side of the plate 302, and located in proximity with respect to each other as illustrated in FIG. 4. The armature plate also includes an alternator coil and core assembly 333 located on the opposite side of the plate 302, as shown. While other shapes might be utilized, the charge coil and core assembly comprises a generally E-shaped laminated core 334 having a central leg 335 upon which the charge coil 15 is mounted in a conventional manner. The trigger coil and core assembly comprises a core 336 including a central portion upon which the trigger coil 71 is mounted. The core 336 has a relatively thin outer edge 338 extending radially outwardly so that a relatively sharp pulse is induced in the trigger coil 71 when one of the magnet gaps passes thereby.

In prior ignition systems, the fly wheel 20 has been utilized with a magneto and timed points. Such a four-magnet fly wheel assembly has heretofore not been able to be utilized with a capacitor discharge ignition circuit for a two-cylinder engine since each two-magnet assembly would cause the trigger coil to generate closely spaced opposite polarity pulses of generally equal magnitude, thereby firing both SCRs in close succession.

In the present arrangement, it has been found that when the trigger core 336 is located in proximity to the charge core 334 as shown in FIG. 4, the second one of the closely spaced trigger voltage pulses has a magnitude substantially less than the magnitude of the first trigger voltage pulse of opposite polarity. More particularly, when the fly wheel is rotated or driven in a preferred clockwise relation relative to the armature plate 302, a first two-magnet assembly rotates past the charge core 334 and then the trigger core 336. In response to this first two-magnet rotation, a first major positive pulse, designated 340, (see FIG. 6) is produced and closely followed (e.g. a few degrees of engine rotation later) by a second minor negative pulse 342 of substantially lessor magnitude (e.g. the magnitude of the minor pulse is less than seventy percent of the magnitude of the major pulse). As the other two-magnet assembly passes the charge core and then the trigger core, a third major negative pulse 344 (spaced about 180° from the major positive pulse 340) is produced with a magnitude substantially equal to the magnitude of the major positive pulse 340, and is closely followed by a fourth minor positive pulse 346 having a magnitude substantially the same as the magnitude of the minor negative pulse 342. As will be discussed in more detail below, the major positive pulse 340 and major negative pulse 344 are spaced about 180° apart with respect to rotation of the fly wheel so as to alternately fire the SCRs substantially every 180 degrees of rotation of the fly wheel.

While the inter-related magnetic effects by which the trigger voltage pulse wave form shown in FIG. 6 is achieved is not completely understood, it is believed to be the result of the trigger coil core 336 being located in proximity to the charge coil core 334 so that the two-magnet assemblies sequentially pass the charge core and trigger core respectively, in close succession. More particularly, it is believed that the minor pulses result as the second gaps of the two-magnet assemblies pass the trigger coil and have a smaller magnitude than the major pulses due to histeresis losses and/or to magnetic flux leakage between the charge coil core and trigger coil core.

The ignition circuit 11 of the ignition system 10, as noted earlier, is particularly adapted to discriminate between the major and minor trigger pulses of the rotary pulse generator 18 so that it can be utilized to control a two-cylinder engine. Thus, the standard four-magnet fly wheel 304 can be utilized with the armature plate 302 to provide the major trigger voltage pulses to control the ignition circuit and, at the same time, provide a relatively increased alternator capacity over an ignition system which, for example, utilizes a fly wheel having only two magnets.

During operation of the rotary pulse generator, the blocking capacitor 83 of ignition circuit 11 develops a blocking voltage, generally designated 351, with a magnitude 353 which coincides with and approaches the magnitude of the first major pulse 340 before gradually discharging to a lower magnitude, 355, which coincides with, but is still significantly greater than the magnitude of the minor pulse 342 (See FIG. 7). Consequently, a trigger current pulse is produced only when a major voltage pulse having a voltage magnitude greater than the blocking voltage is induced in the trigger coil. More particularly, the major trigger voltage pulse 340 and the major trigger voltage pulse 344 cause production of trigger current pulses 350 and 352 to alternately fire the switches or SCRs 51 and 53 to control firing of the spark plugs 41 and 43, respectively, of the two-cylinder engine (See FIG. 8). Thus, ignition circuit 11, including active pulse discriminating means, or the active filter circuit 53, discriminates between the major and minor pulses.

The disclosed ignition circuit 11 can be used with a one-cylinder engine by omitting use of one of the ignition coils 31 and 33 and the associated spark plug 41 or 43 and by replacing the associated switch 51 or 53 with a resistor. More particularly, shown in FIG. 2 is another ignition circuit 211 which is similar to the ignition circuit 11 shown in FIG. 1, except that, in the triggering sub-circuit 225, ignition coil 31 and spark plugs 41 have been omitted and the SCR 51 and capacitor 161 have been replaced with the resistor 251 which approximates the resistive load of the SCR replaced and can be, for example, approximately 150 ohms. As the circuit 211 is otherwise the same as that shown in FIG. 1, no further description is necessary.

The rotary pulse generator is preferably constructed as already mentioned for use with circuit 11. For the ignition circuit 211, a fly wheel assembly having a single two-magnet assembly, as previously described, or a single magnet with oppositely polarized ends could be employed. In either event, the ignition circuit 211 would discriminate so that only a single major pulse produced for every rotation of the fly wheel would effect firing of the spark plug 43. Minor pulses and noise pulses would be ineffective to trigger the SCR 53 because of the buildup of the blocking voltage on the capacitor 83 occurring in response to the major pulse.

If desired, the ignition circuits 111 and 211 can be utilized with multi-cylinder engines if an appropriate number of individual triggering sub-circuits are employed for the desired number of cylinders.

Various of the features of the invention are set forth in the following claims.

What is claimed is:

1. A rotary pulse generator including an armature having a two-magnet assembly including spaced pole pieces defining a pair of spaced gaps, an armature plate including a charge core and charge coil mounted thereon, and a trigger core and trigger coil mounted thereon, said trigger core being separate from said charge core but located in proximity to said charge core so that, at a given armature speed, said trigger coil produces a repeating series of trigger pulses including a first major voltage pulse of one polarity and of a major magnitude closely followed by a second minor voltage pulse of opposite polarity and of a minor magnitude substantially less than said major magnitude, said repeating series of trigger pulses being produced in response to said two-magnet assembly sequentially rotating past said trigger core and said charge core.

2. A rotary pulse generator in accordance with claim 1 wherein said armature comprises a fly wheel including a second two-magnet assembly located on the opposite side of said fly wheel from said first mentioned two-magnet assembly, said first two-magnet assembly have a first common pole face of one polarity and said second two-magnet assembly having a second common pole face of the opposite polarity, whereby said trigger coil, at a given fly wheel speed, produces a repeating series of trigger pulses including said first major positive voltage pulse closely followed by said second minor negative voltage pulse in response to said first two-magnet assembly sequentially rotating past said trigger core and said charge core, and produces a third major negative voltage pulse of the opposite polarity from said first major pulse and having a magnitude generally equal to said major magnitude, closely followed by a fourth minor positive voltage pulse of the opposite polarity from said second minor negative pulse and having a magnitude generally equal to said minor magnitude, said third and fourth pulses being generated when said second two-magnet assembly sequentially rotates past said trigger core and said charge core, whereby said first major pulse and said third major pulse are spaced substantially 180 degrees apart with respect to rotation of said fly wheel.

3. A rotary pulse generator in accordance with claim 2 wherein said charge core is generally E-shaped and includes a pair of end legs and a central leg spaced between said end legs, wherein said charge coil is mounted on said central leg, and wherein said trigger core is located adjacent one of said end legs and includes a thin edge extending radially outwardly so that a relatively sharp pulse is produced by said trigger coil each time one of said spaced gaps passes thereby.

* * * * *